United States Patent
Hallerback

[15] 3,701,911
[45] Oct. 31, 1972

[54] MOTOR BEARING SUPPORT AND COOLING MEANS

[72] Inventor: Stig Lennart Hallerback, Vastra Frolunda, Sweden

[73] Assignee: SKF Industrial Trading and Development Company N.V., Amsterdam, Netherlands

[22] Filed: May 20, 1971

[21] Appl. No.: 145,450

[30] Foreign Application Priority Data

May 20, 1970 Sweden....................7060/70

[52] U.S. Cl. .........................310/60, 310/61, 310/90
[51] Int. Cl. ..........................................H02k 9/04
[58] Field of Search..........310/58, 59, 60, 61, 86, 62, 310/63, 57, 89, 227, 90, 259

[56] References Cited

UNITED STATES PATENTS

| | | | |
|---|---|---|---|
| 3,343,016 | 9/1967 | Lewis | 310/90 |
| 2,825,827 | 3/1958 | Luenberger | 310/60 |
| 2,488,365 | 11/1949 | Abbott et al. | 310/62 |
| 2,222,764 | 11/1940 | Gaston | 310/60 |
| 990,948 | 5/1911 | Baker | 310/59 |
| 2,929,944 | 3/1960 | Shewmon | 310/58 X |
| 3,007,064 | 10/1961 | Ward | 310/61 X |

FOREIGN PATENTS OR APPLICATIONS

| | | | |
|---|---|---|---|
| 287,441 | 2/1966 | Australia | 310/63 |

Primary Examiner—D. F. Duggan
Attorney—Howson & Howson

[57] ABSTRACT

A bearing support for apparatus having a rotor mounted on a shaft and a stator having windings comprising a cup-shaped member consisting of an inner section for supporting rotor bearing means and an outer section secured at its outer periphery to the stator at a point radially inwardly of the windings and spaced from said rotor to define a rotor chamber, means defining a plurality of openings in the outer section of the cup-shaped member to provide an effectively cooling air flow to and from the rotor chamber upon relative rotation of the rotor and stator, the openings being of a configuration and orientation to direct the air over the windings and bearing means.

10 Claims, 15 Drawing Figures

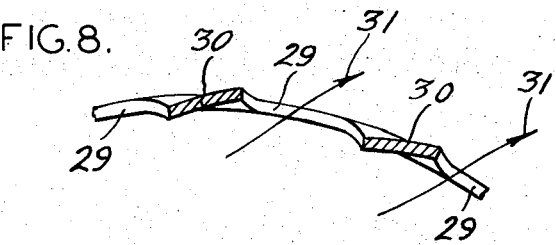
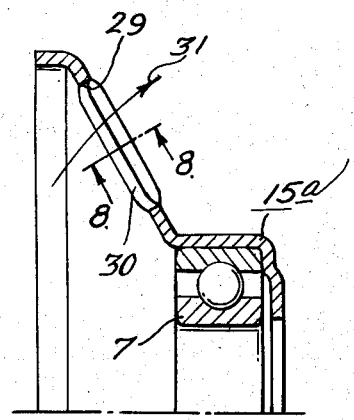
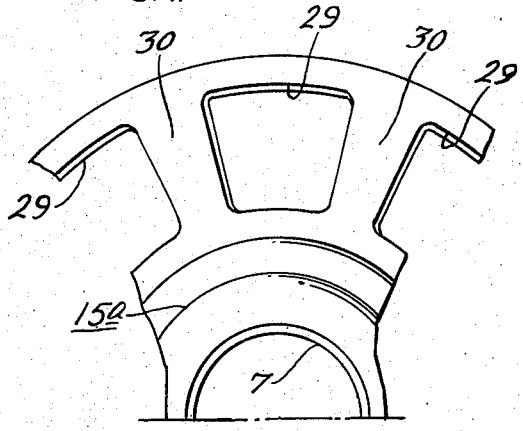
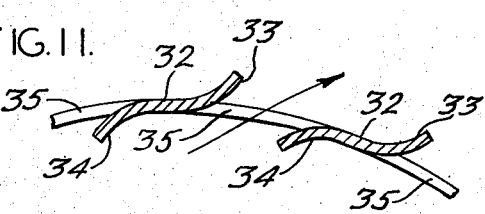
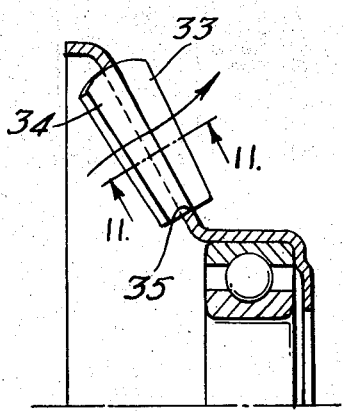
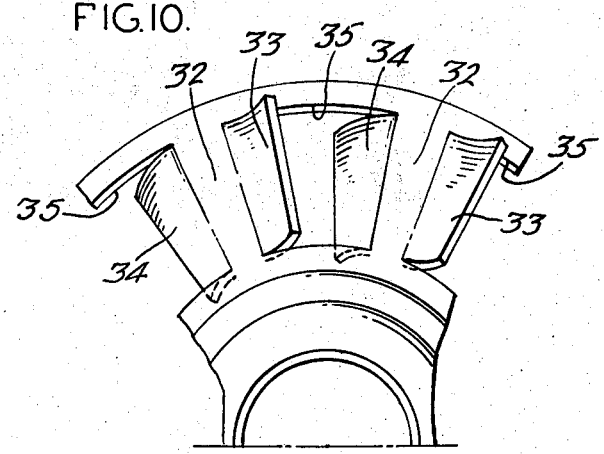

MOTOR BEARING SUPPORT AND COOLING MEANS

The present invention relates to electric machines provided with stator and rotor structures and relates more particularly to a bearing support for use in electric motors and other rotary electric machines; this bearing support comprising a cup-shaped member having cooling air openings and designed to be affixed at its larger end to the stator core radially inside the end coils and at its smaller end supporting rotor bearing means.

An efficient cooling of electric motors is often of essential importance. For this reason it is usual to provide when compatible with the operating conditions of the motor the bearing shields of the motor with cooling air openings which are often designed with as large a total area as the demands on the rigidity of the bearing shield and other circumstances admit. Sometimes the bearing shield is provided with special inside guide members for the cooling air, since the cooling air openings do not provide sufficient cooling effect in themselves. Such guide members involve a complicated and cost-raising arrangement and provide but a limited effect, however. In order to improve the cooling of electric motors it is further a well-known practice to provide the motors with cooling fans. As small overall motor dimensions are desirable, it is an obvious disadvantage, however, to introduce conventional fans placed outside the motor unit proper. Such fans furthermore generate a noise that rises the noise level. Obviously, such fan arrangements also increase the manufacturing cost.

It is further priorly known to construct electric motors having their bearing supports located inside the end coils of the stator windings. In this way small motor dimensions are obtained, and such motors satisfy high demands as to silent running. Further, the manufacturing costs are reduced. The disposition of the bearing support inside the end coils as close to the end faces of the rotor as possible results in a motor having minimized overall dimensions, being of a compact build with small inner air spaces. This will, however, give rise to accentuated difficulties with dissipation of the heat generated in the rotor chamber. The cooling problems are further stressed in such constructions where the cup-shaped bearing supports are made of non-metallic material having poor heat-conducting qualties. In such case the cooling conditions of the journal bearings of the rotor will be impaired, as well. Furthermore, a bearing support attached inside the stator end coils has a smaller area than conventional bearing supports that are not attached in this manner and, thus, does not permit the provision of cooling openings with a total area comparable with that of a conventional motor.

Although the compact motor unit referred to thus is subjected to certain cooling difficulties, the rotor chamber confined by the bearing support surprisingly offers opportnities for the provision of a most efficient cooling of the rotor, bearings, bearing supports and stator windings. According to the invention, this effect is attained through providing in the cup-shaped bearing support cooling air openings having such a relative radial disposition and/or being designed with edge portions forming guiding surfaces, that an effectively cooling air flow to and from the rotor chamber and through at least part of the same is generated, this air flow being directed in such a way that it flows over the end coils outside the bearing support and preferably also over the rotor bearing means. These cooling openings act in conjunction with the rotor and the air in the rotor chamber, which rotates, undisturbed by any obstructing motor components, as a consequence of the rotation of the rotor. With bearing supports according to the invention a guided cooling action can be obtained from the center of the motor radially outward or longitudinally through the rotor chamber. These cooling openings act in conjunction with the rotor and the air in the rotor chamber which rotates, undisturbed by any obstructing motor components, as a consequence of the rotation of the rotor. With bearing supports according to the invention, a guided cooling action can be obtained from the center of the motor radially outward or longitudinally through the rotor chamber.

The strong cooling air stream efficiently ventilates the rotor chamber and cools the rotor, thus solving the specific heat problem inherent in the present type of motor. The directed air flow gives a better cooling than that provided in fanless, conventional motors of the end coils and the rotor bearings and thus of the entire motor. The cooling effect can be obtained according to the invention without the need for increased motor dimensions and without any additional manufacturing costs for bearing supports and other motor components. A higher noise level is not likely to arise.

The invention will be described more in detail hereinafter, reference being had to the drawings which illustrate by way of example several arrangements embodying the principles of the invention. In the drawings.

Figure 5:
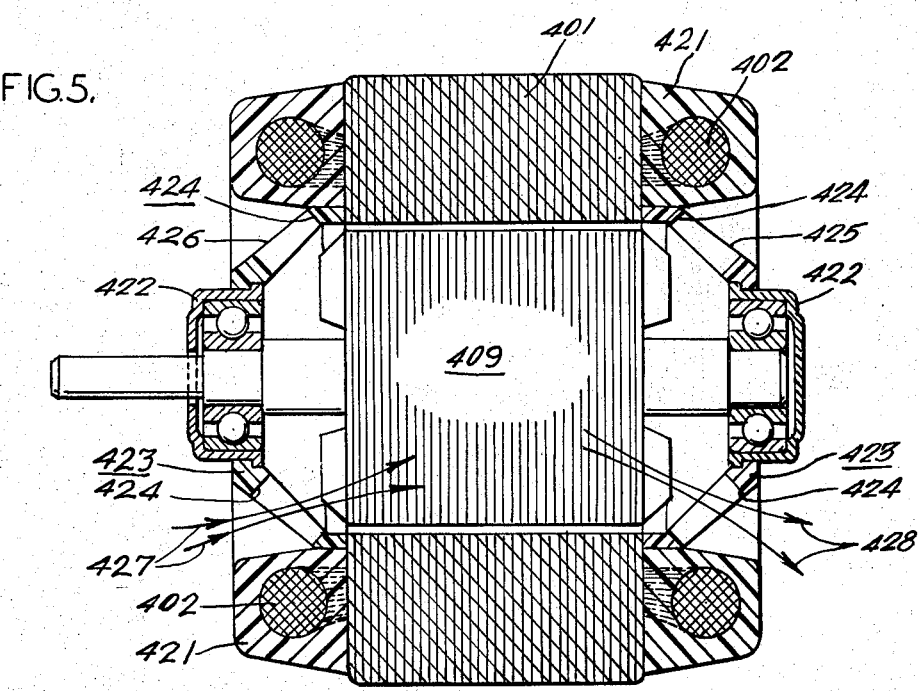
Figure 14:
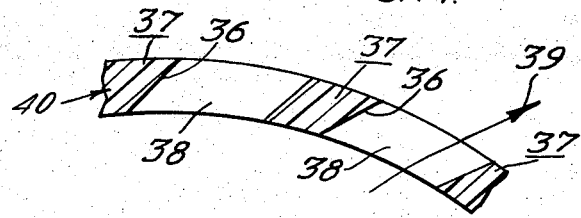
Figure 12:
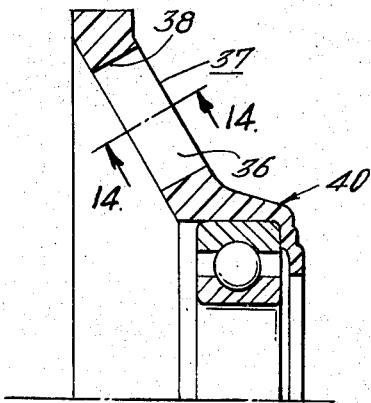

FIG. 5 is a diagrammatic longitudinal section view of an electric motor with bearing supports shaped for an axially guided cooling air flow; and FIGS. 6 to 15 inclusive are detail views of bearing supports and cooling openings, FIGS. 8, 11 and 14 are sectional views taken on lines 8—8, 11—11, and 14—14 in FIGS. 6, 9, and 12, respectively.

Figure 1:
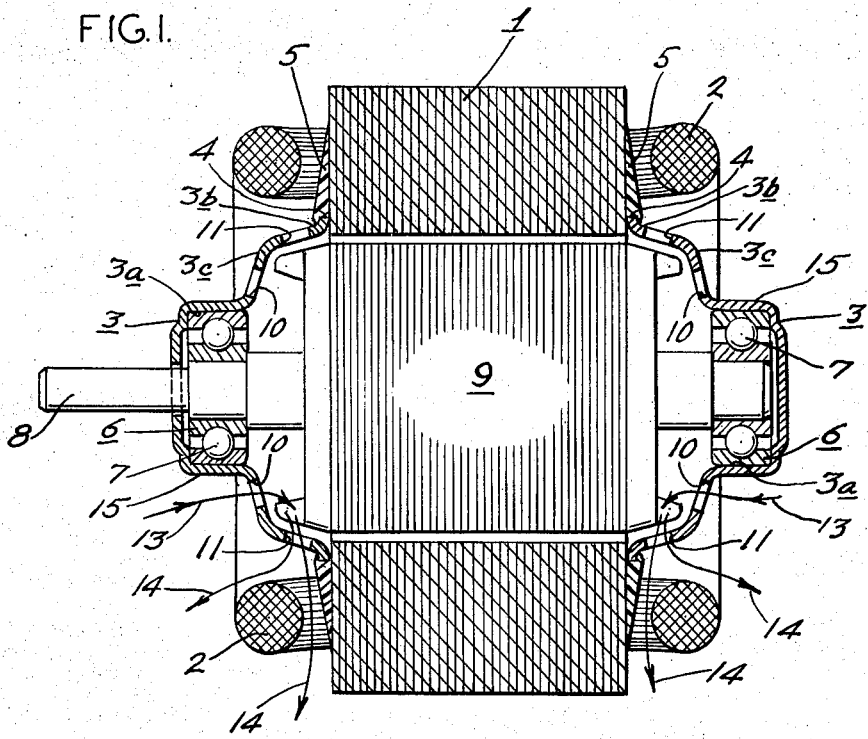
FIG. 1 is a diagrammatic longitudinal section view of an electric motor with cup-shaped bearing supports providing a radially directed cooling air flow.

The electric motor illustrated in FIG. 1 comprises a laminated stator core 1 with stator windings 2 of which the end coils are visible. The bearing support 3 is affixed to the stator core radially inside the stator winding end coils. The bearing supports 3 carry in rolling bearings 7 (shown as ball bearings) the rotor shaft 8 with the rotor 9. The bearing support 3 as illustrated comprises a cup-shaped inner section 3a for mounting the rotor bearing assembly 6 and an outer section 3b secured to the stator core 1 inboard of the stator windings 2. The outer section 3b in the present case has a series of circumferentially extending spaced openings 10 adjacent the cup-shaped inner section 3a and a series of circumferentially extending spaced openings 11 adjacent the stator windings 2. The outer section 3b, which is formed integrally with the inner section 3a, has a continuous angular wall 3c dividing the series or rows of openings 10 and 11, the angulated wall 3c dividing the outer section into offset sections so that openings 11 are generally facing the end coils and extend in a generally radial direction, and the openings 10 are located in a generally radial wall segment and, thus, extend axially facing the axial end face of the rotor. Thus, when the cooling air sweeps over the central bearing structure 15, the latter is cooled. When through the effects of rotation the cooling air is forced out through the cooling openings 11, the air will flow across and through the end coils 2 and will cool the latter. Since the end coils are disposed outward of the bearing support, the air flow in the rotor chamber is not obstructed by any motor components that might have a restricting effect thereon. The bearing support 3 is rigidly held in its position by being bonded to a hardening substance 5 molded on to the stator and is centrically guided by its outer circumference 4.

Figure 2:
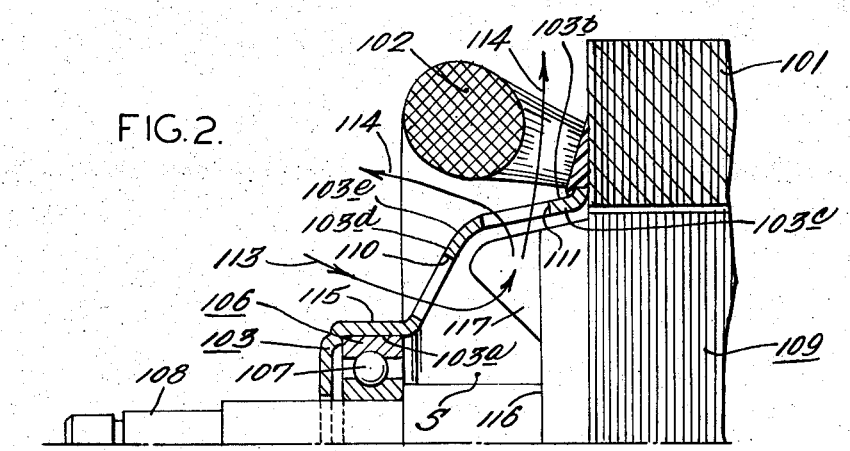
FIGS. 2 and 3 are fragmentary section views illustrating alternative bearing support structures.

FIG. 2 is a fragmentary section view of an electric motor with the type of bearing support 103 shown in FIG. 1. The bearing support 103 has a cup-shaped inner section 103a and the outer section 103b has a frustoconical shape with two different conicities, a lesser conicity 103c toward the larger end of the holder and a greater conicity 103d toward the smaller end of the holder with the bearing socket 103a. The conical sections 103c and 103d are connected by a continuous circumferential angularly offset connecting wall 103c. At its end face 116, the rotor 109 is formed with projections 117 which, owing to the shape of the bearing support with two different conicities, can be readily accommodated in the rotor chamber S. Such projections normally exist in one form or other, provided that the rotor is of the short-circuited type and die-cast, when they are formed by the remaining feeding necks. The rotor projections 117 increase the ability of the rotor to carry along the air in rotation. In the holder there are cooling openings 110 provided in the portion having the greater conicity, and further there are cooling openings 111 in the portion having the lesser conicity. The passage of the fresh ambient air in through the minimal rotor space S and out through and by the end coils is indicated by arrows 113 and 114. The cooling openings 111 are disposed in such a way that they guide the cool air toward and around the end coils 102, and thus also in between the end coils and the laminated stator core. Through the natural direction from the center radially outward, an efficient cooling of the end coils of the motor is obtained at the same time as the central bearing structure 115 and the end surface 116 of the rotor are efficiently cooled by the air.

Figure 3:
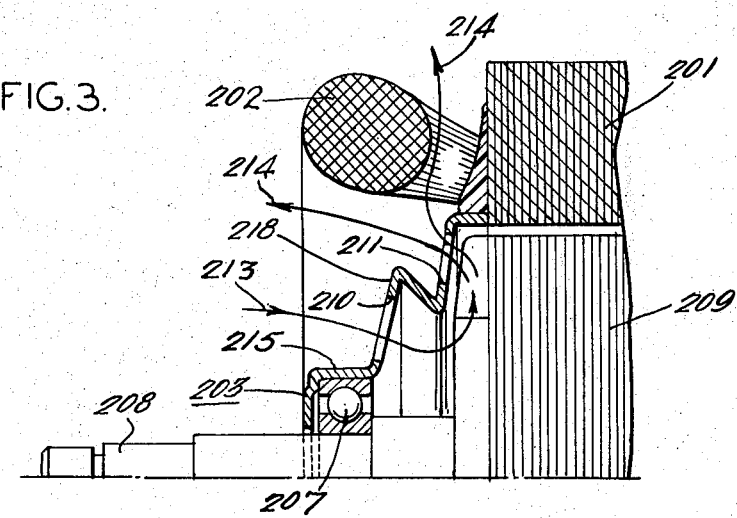

FIG. 3 illustrates a modified form of a bearing support 203, so that the outer section is of a bellows-like shape as indicated at 218 and the openings 210 and 211 are generally axially directed. This permits some degree of axial displacement in operation of the rotor bearing 207 while the cooling surface of the bearing support is increased and an improved centrifugal effect is obtained at the radially outer cooling openings. The arrows 213 and 214 indicate how the cooling air flows into and out of the rotor chamber and how the end coils are licked by the stream of cooling air.

Figure 4:
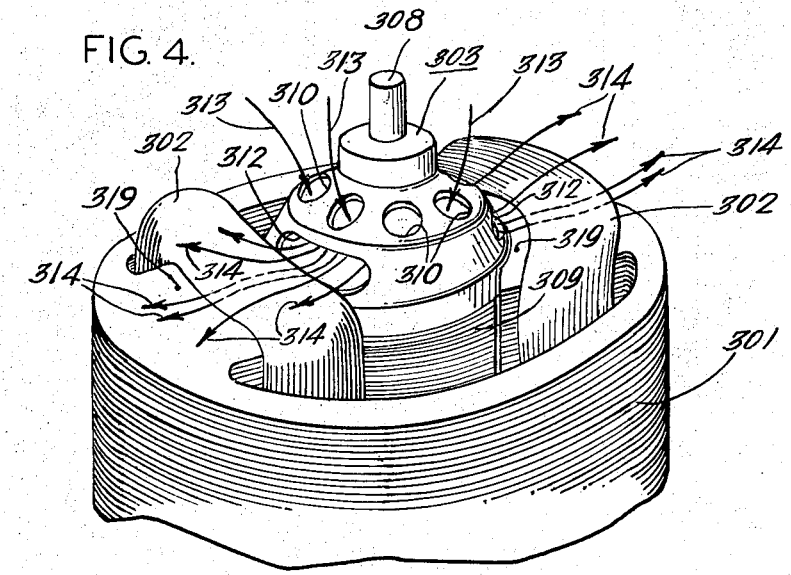
FIG. 4 is a fragmentary perspective view of a motor provided with separately wound stator poles and bearing support means according to the invention.

FIG. 4 is a fragmentary perspective view of a two-pole motor, where the two poles 319 are surrounded by the winding coils 302 while the rotor 309 is journaled in the bearing support 303. This type of motor as well as other machines with separately wound poles have, unlike stators for asynchronous motors, open spaces between the poles axially of the rotor. In this type of machines the cooling effect aimed at according to the invention and directed toward the stator windings is not achieved if the cooling air would emerge between the bearing support and the open parts of the stator. According to the invention, the outer section of the bearing support is, therefore, formed close to the axis with a series of openings 310 through which the air flow 313 is aspired. This air flow is led toward the end coils by further openings 312 at a greater radial distance from the axis inside of the end coils. In the present instance, there are two oval-shaped openings 312 which are diametrically opposed. The openings 310 and 312 are separated by a continuous angular wall portion so that the openings 312 are generally radially directed and aligned with the space between the windings at the poles 319 to effect flow of cooling air in the manner indicated by the arrows 314; that is, over and under the windings, thus causing the cooling air 314 to lower the temperature of the windings. To prevent reduced cooling effect by air leakage at the portions of the rotor 309 exposed between the poles the bearing support at these areas is formed with portions surrounding the end surface of the rotor. The leaking air that might emerge through the gap between the bearing support and the rotor is only a small fraction of the guided cooling air volume.

FIG. 5 is a diagrammatic longitudinal section view of an electric motor, of which the stator core 401 and windings 402 are entirely molded into a thermo-setting plastic substance or compound 421, against which the bearing supports are affixed. These bearing supports are formed with a central bearing structure 422 around which a frustoconical synthetic resin flange 423 has been molded. At its larger end this flange is adapted for fixation to the stator core inside the end coils of the windings 402. A series of openings 424 in the flange 423 are formed with oblique edges 425, 426 so arranged that at the running of the rotor ambient air is aspired into one end of the motor as indicated by the arrows 427. If the motor is equipped with identical bearing supports at both ends, the cooling air will, during operation, be aspired through one bearing support and exhausted (arrows 428) through the other, due to the fact that the bearing supports are opposed, and in this way the cooling air will flow axially through the rotor chamber. During its passage through the motor, the air cools the rotor as well as the stator. Furthermore, the aspired air will have a cooling effect on the central bearing structure and the end coils of the stator. A similar cooling effect is obtained as the air is exhausted at the other end of the motor.

Whereas the bearing support illustrated in FIG. 5 is partly made of synthetic resin, the bearing support illustrated in FIGS. 6–8, is made entirely of sheet metal. The structure illustrated in FIG. 6 has a central bearing part 15a with a rolling bearing 7. FIG. 7 is an end view of this bearing support with the cooling openings 29 and the intermediate spoke portions 30. FIG. 8 shows a cross-section of such a cooling opening 29 and two spoke portions 30. The spoke portions 30 are, as illustrated in FIG. 8, tilted so as to pick up and lead away air indicated by arrows 31 and rotating in the rotor chamber.

FIGS. 9, 10, and 11 illustrate a similar bearing support made of sheet metal. To heighten the effect upon the incoming as well as the outgoing airflow, parts 33, 34 of the spoke portions 32 between the openings 35 have been bent downward or upward, respectively. Both structures illustrated in FIGS. 6 to 11 are inexpensive, since the configurations having the desired effect on the cooling air flow are obtained by manufacturing methods which readily lend themselves to mass production.

Figure 13:
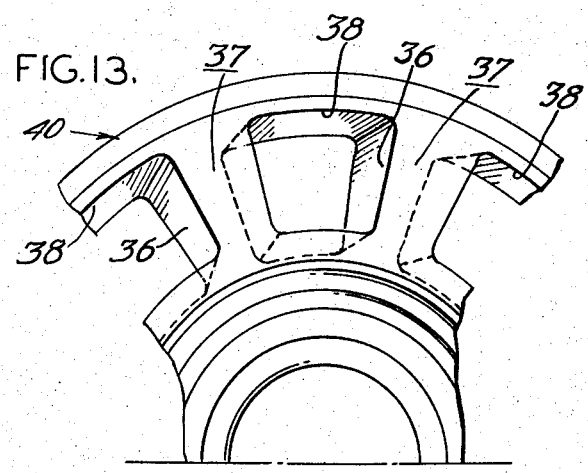

FIGS. 12, 13 and 14 illustrate a bearing support 40 as made of synthetic resin. The spokes 37 have edges 36 which are oblique so as to offer an angle of incidence to the rotating air, to facilitate the passage of the cooling air flow in through and out through the openings 38, respectively, as indicated by the arrow 39.

Figure 15:
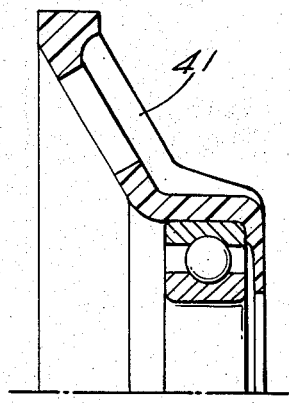

FIG. 15, finally, shows how the cooling action of the air can be strengthened by the provision of additional flange or ridge-like portions 41. Similar portions can, of course, be provided at the inside of the bearing support.

Bearing supports such as briefly described with reference to FIGS. 1–3 can, of course, be provided with cooling openings such as illustrated in FIGS. 6 to 15 in order to attain an improved circulation of cooling air.

I claim:

1. A bearing support for apparatus having a rotor mounted on a shaft and a stator having windings comprising a cup-shaped member consisting of an inner section for supporting rotor bearing means and an outer section secured at its outer periphery to the stator at a point radially inwardly of the windings and spaced from said rotor to define a rotor chamber, means defining a plurality of openings in the outer section of the cup-shaped member to provide an effectively cooling air flow to and from the rotor chamber upon relative rotation of the rotor and stator, the openings being of a configuration and orientation to direct the air over the windings and bearing means.

2. A bearing support for apparatus having a rotor mounted on a shaft and a stator having windings comprising a cup-shaped member consisting of an inner section for supporting rotor bearing means and an outer section secured at its outer periphery to the stator at a point radially inwardly of the windings and spaced from said rotor to define a rotor chamber, said outer section including a pair of offset segments connected by a continuous circumferential wall portion, means defining a plurality of openings in each of said segments providing an effectively cooling air flow to and from the rotor chamber upon relative rotation of the rotor and stator, the openings being of a configuration and orientation to direct the air over the windings and bearing means.

3. A bearing support as claimed in claim 2 wherein said segments are of conical configuration and wherein the segment adjacent the bearing assembly is of a greater conicity than the conicity of the other segment.

4. A bearing support as claimed in claim 2 wherein the circumferential wall portion is reversely folded.

5. A bearing support as claimed in claim 2 wherein the outer section is of a configuration to accommodate projections from the end face of the rotor, said projections operable to circulate air in the rotor chamber.

6. A bearing support as claimed in claim 2 wherein said stator has separately wound poles and with at least one open section extending axially between the poles along the rotor and wherein the bearing support at these sections surrounds the end portions of the rotor, leaving a narrow gap between rotor and bearing support.

7. A bearing support for apparatus having a rotor mounted on a shaft and a stator having windings comprising a cup-shaped member consisting of an inner section for supporting rotor bearing means and an outer section secured at its outer periphery to the stator at a point radially inwardly of the windings and spaced from said rotor to define a rotor chamber, means defining a plurality of openings in the outer section of the cup-shaped member to provide an effectively cooling air flow to and from the rotor chamber upon relative rotation of the rotor and stator, the openings being of a configuration and orientation to direct the air over the windings and bearing means, the edges of said cooling openings being formed as guiding and directing surfaces.

8. A bearing support as claimed in claim 7 wherein the guiding and directing surfaces of the cooling openings are made in such a way that a volume of air rotating inside the rotor chamber is conveyed out through the openings at one relative sense of rotation and conveyed in through the openings at the opposed relative sense of rotation, whereby, when a bearing support is affixed at each end of an electric motor, the ambient cooling air is conveyed into and through one of the bearing supports, through the rotor chamber and out through the second bearing support.

9. A bearing support for apparatus having a rotor mounted on a shaft and a stator having windings comprising a cup-shaped member consisting of an inner section for supporting rotor bearing means and an outer section secured at its outer periphery to the stator at a point radially inwardly of the windings and spaced from said rotor to define a rotor chamber, means defining a plurality of openings in the outer section of the cup-shaped member to provide an effectively cooling air flow to and from the rotor chamber upon relative rotation of the rotor and stator, the openings being of a configuration and orientation to direct the air over the windings and bearing means, the edges of said cooling openings presenting oblique guiding surfaces for the cooling air.

10. A bearing support as claimed in claim 9 wherein wall portions in the vicinity of the openings in the form of tongues have been forced up or down from the material remaining between the openings.

* * * * *